Figure 1:
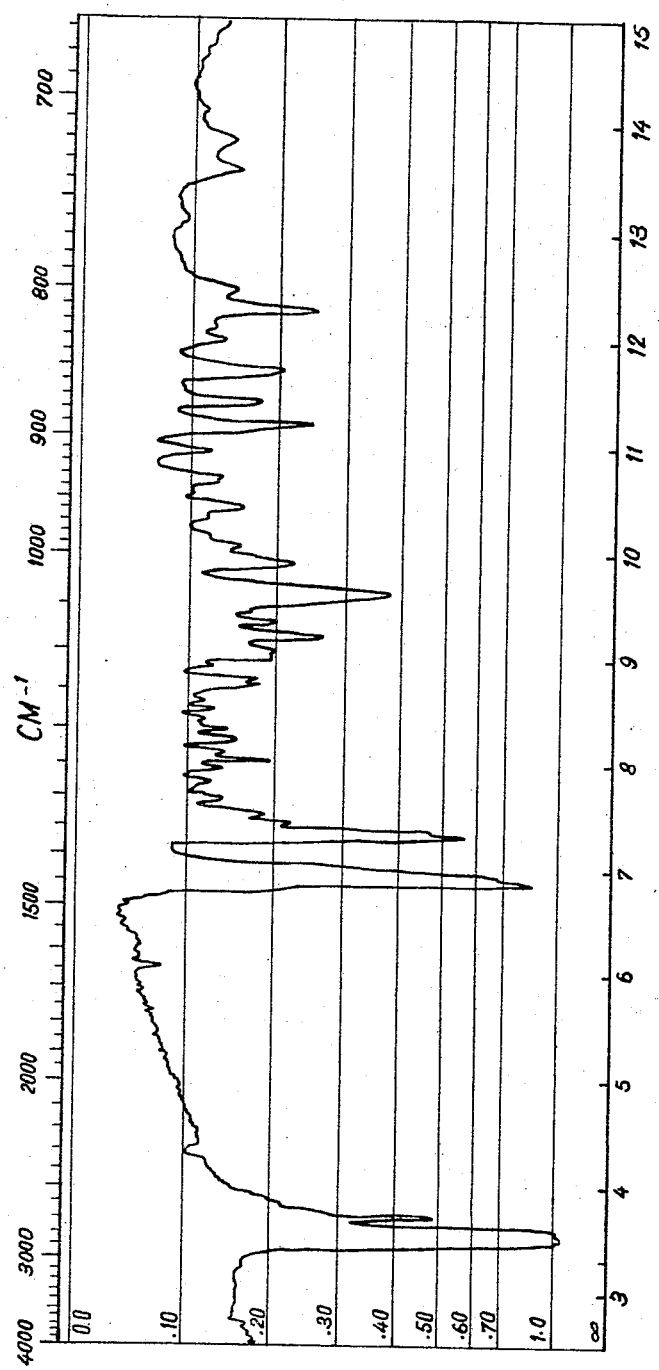

INVENTOR:
JEAN LE MEN

United States Patent Office 3,331,836
Patented July 18, 1967

3,331,836
3β-AMINO-18,20-OXIDO-5α-PREGNANE AND
5-PREGNENE COMPOUNDS
Jean Le Men, Limeil-Brevannes, France, assignor to
Roger Bellon, Neuilly-sur-Seine, Seine, France
Filed Sept. 18, 1964, Ser. No. 397,370
Claims priority, application Great Britain, Sept. 26, 1963,
38,027/63
18 Claims. (Cl. 260—239.55)

This invention relates to 3-aminopregnane derivatives and their preparation.

In U.S. Patents Nos. 3,197,471 and 3,137,691, I have described 3β-amino derivatives of 5α-pregnane and 5-pregnene containing alcohol groups in the 18- and 20-positions, which are produced from the steroids called paravallarine and paravallaridine.

The present invention provides new derivatives of these steroids, which have the following general formula, which covers both the 20R and 20S series:

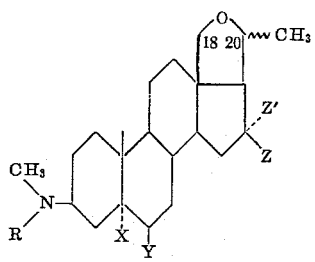

I wherein R represents hydrogen or an alkyl group, preferably containing 1 to 4 carbon atoms, or an acyl group, preferably an alkanoyl group containing up to 4 carbon atoms, X and Y are hydrogen or together represent a single bond (so as to form a double bond between positions 5 and 6 of the steroid nucleus), one of Z and Z' is hydrogen and the other is hydroxy or acyloxy, preferably alkanoyloxy containing up to 4 carbon atoms, or Z and Z' together represent an oxo group, as well as the acid addition salts of these new derivatives.

These compounds are active anti-inflammatory agents having a good therapeutic index, and can be used, for example, in the treatment and prevention of gastric ulcers. This activity has been demonstrated in the kaolin arthritis test. Experimental arthritis is produced by injecting 0.2 cc. of a sterile 10% kaolin suspension into the tibiotarsal joint of the test animal. The diameter of the joint is then measured after a predetermined lapse of time. In the test, it was found that (20R)-3β-N-methylamino-16α-hydroxy-18,20-oxido-5-pregnene, (20R)-3β-N-methyl-N-acetylamino-16α-acetoxy-18,20 - oxido-5 - pregnene, and (20R)-3β-N-methylamino-16β-hydroxy-18,20-oxido-5α-pregnane in doses of 20 to 50 mg./kg. (by intraperitoneal injection) showed activities greater than cortisone, while not producing toxic effects at dosages below 200 to 300 mg./kg.

In Shay's ulcer test, gastric ulcers are produced in the rat by ligature of the pylorus. An intraperitoneal dose of 50 mg./kg. of (20R)-3β-N-methyl-N-acetylamino-16α-acetoxy-18,20-oxido-5-pregnene caused disappearance of the ulcers in 80% of the rats treated.

According to one embodiment of the invention, the new compounds are prepared by treating, with a mineral acid, e.g. hydrochloric acid, in a polar solvent, such as water or an alcohol miscible with water or a mixture of the two, at a temperature between 60° and 100° C., a compound of the formula:

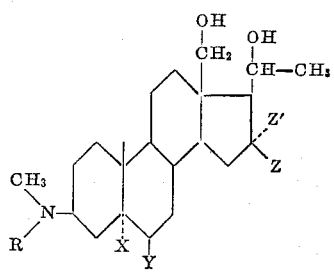

wherein R, X, Y, Z and Z' are as hereinbefore defined. This reaction leads to a cyclisation giving an 18,20-oxido group, with reversal of the configuration of the 20-carbon atom.

According to another embodiment of the invention, the compounds of Formula I in which R is alkyl are prepared by alkylating, e.g. methylating with formaldehyde and formic acid, a compound of the formula:

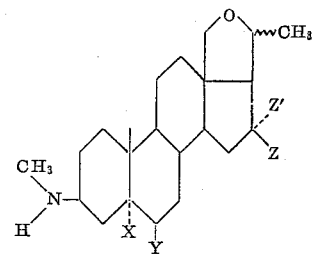

where X, Y, Z and Z' are as hereinbefore defined

According to another embodiment of the invention, the compounds of Formula I in which R is an acyl group are prepared by acylating, e.g. with acetic anhydride and pyridine to introduce an acetyl group, a compound of the formula:

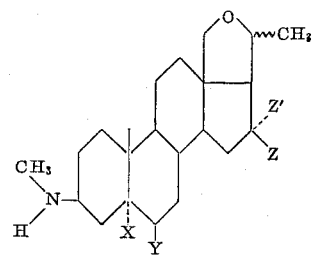

where X, Y, Z and Z' are as hereinbefore defined.

According to another embodiment of the invention, the compounds of Formula I in which X and Y are both hydrogen atoms are prepared by reducing by catalytic hydrogenation, e.g. in the presence of Adams' platinum catalyst, a corresponding compound in which X and Y together represent a single bond.

According to another embodiment of the invention, the compounds of Formula I in which Z is an hydroxyl group and Z' is a hydrogen atom are produced by reduction with sodium or potassium borohydride of a corresponding compound in which Z and Z' together represent an oxo group.

According to another embodiment of the invention, the compounds of Formula I in which Z and Z' together represent an oxo group are prepared by oxidizing, e.g. with chromic acid, a corresponding compound in which one of Z and Z' is a hydrogen atom and the other a hydroxyl group.

According to another embodiment of the invention, the compounds of Formula I in which one of Z and Z' is acyloxy and the other is hydrogen are prepared by acylation of a corresponding compound in which one of Z and Z' is hydroxy.

It is also possible to produce compounds of Formula I by reduction of the corresponding lactones (i.e. compounds with an oxo group in the 18-position) with lithium aluminium hydride in the presence of a Lewis acid.

The starting materials for these processes, insofar as they are not themselves compounds of Formula I, may be prepared in accordance with the procedures described in my U.S. Patent Nos. 3,197,471 and 3,137,691. The new compounds are thus prepared from paravallarine and paravallaridine by the steps of reduction of the lactone group to give a diol followed by cyclization of this diol under the conditions specified for the first process above, optional acylation or alkylation of the 3—$CH_3NH$— group, optional acylation of a 16-hydroxyl group when present, optional reduction of the $\Delta^5$-double bond, and optional epimerization (via the 16-oxo group) of a 16α- to a 16β-hydroxyl group. These steps may be carried out in any desired order but reaction procedures must, of course, be chosen in which the desired steps are not accompanied by simultaneous undesired changes in the reactants. Thus, the conversion of a 16α- to a 16β-hydroxyl group must be carried out on a lactone or 18,20-oxido compound and not on a compound which is an 18,20-diol.

The invention includes within its scope pharmaceutical compositions, e.g. tablets, pills, capsules, or sterile injectable solutions or suspensions, comprising one or more of the compounds of the invention in association with a conventional, compatible pharmaceutical carrier.

The invention is illustrated by the following examples.

*Example 1.—(20R)-3β-N,N-dimethylamino-18,20-oxido-5-pregnene*

100 mg. of N-methylparavallarinol[(20S)-3β-N,N-dimethylamino-18,20-dihydroxy-5-pregnene] are dissolved in 10 cc. of methanol containing 2 cc. of hydrochloric acid and heated under reflux for 30 minutes. The resulting reaction mixture is added to 150 cc. of water, is made alkaline by means of sodium hydroxide and extracted with ether. There are obtained 95 mg. of residue, which gives 71 mg. of the desired oxido derivative on recrystallisation from a mixture of acetone and ether. The compound melts at 157° C. $(\alpha)_D^{20°}=48°$ (c.=0.474 in chloroform).

Analysis for $C_{23}H_{37}ON$ gives: Calculated: C=80.41%; H=10.86%. Found: C=80.28%; H=10.75%.

The infra-red spectrum of the compound is shown in the FIGURE 1 of the accompanying drawings.

*Example 2.—(20R)-3β-N-methylamino-18,20-oxido-5-pregnene*

By a method identical to that described in Example 1, 100 mg. of paravallarinol[(20S)-3β-N-methylamino-18,20-dihydroxy-5-pregnene] gave 58 mg. of the desired oxido derivative. It melts at 119° C. $(\alpha)_D^{20°}=-54°$ (c.=0.462 in chloroform).

Analysis for $C_{22}H_{35}ON$ gives: Calculated: C=80.19%; H=10.70%. Found: C=80.33%; H=10.76%.

Figure 2:
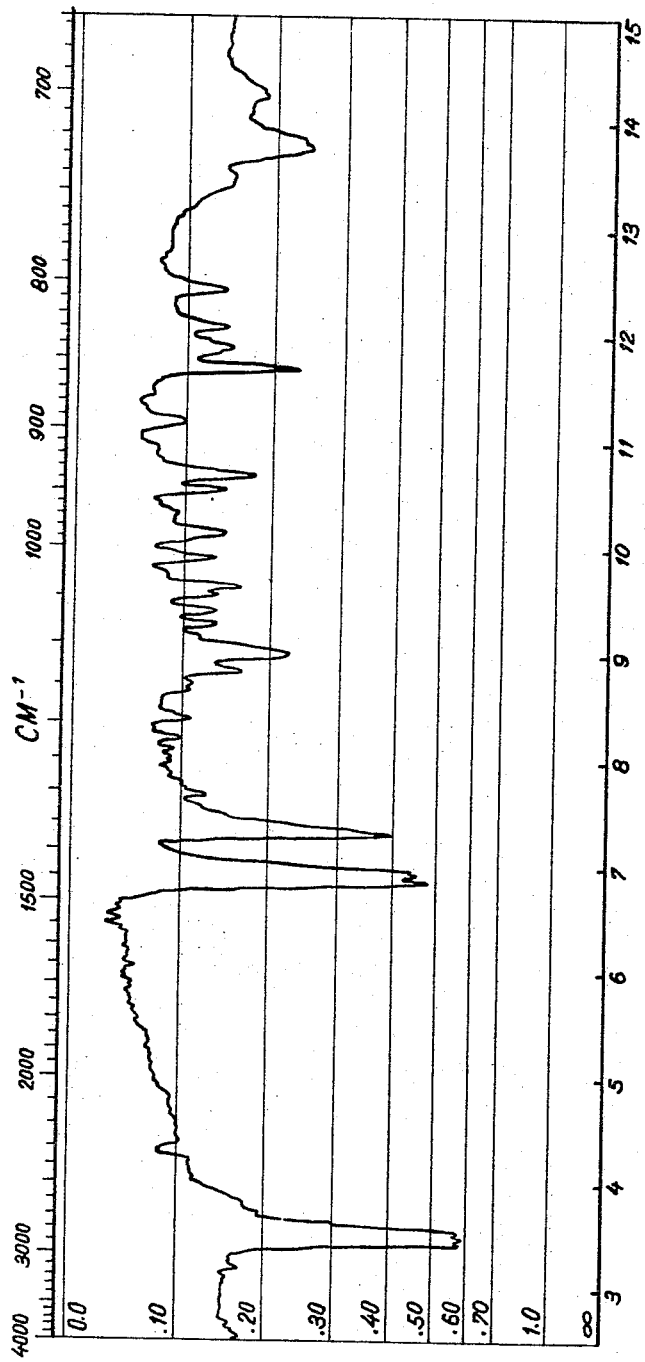

The infra-red spectrum of the compound is shown in FIGURE 2.

*Example 3.—(20R)-3β-(N-methyl-N-ethylamino)-18,20-oxido-5-pregnene*

By a method identical to that described in Example 1, N-ethylparavallarinol gives the corresponding oxido derivative. It melts at 109–110° C. $(\alpha)_D^{20°}=-44°$ (c.=1.0 in chloroform).

Analysis for $C_{24}H_{39}ON$ gives: Calculated: C=80.61%; H=10.99%. Found: C=80.75%; H=11.13%.

Figure 3:
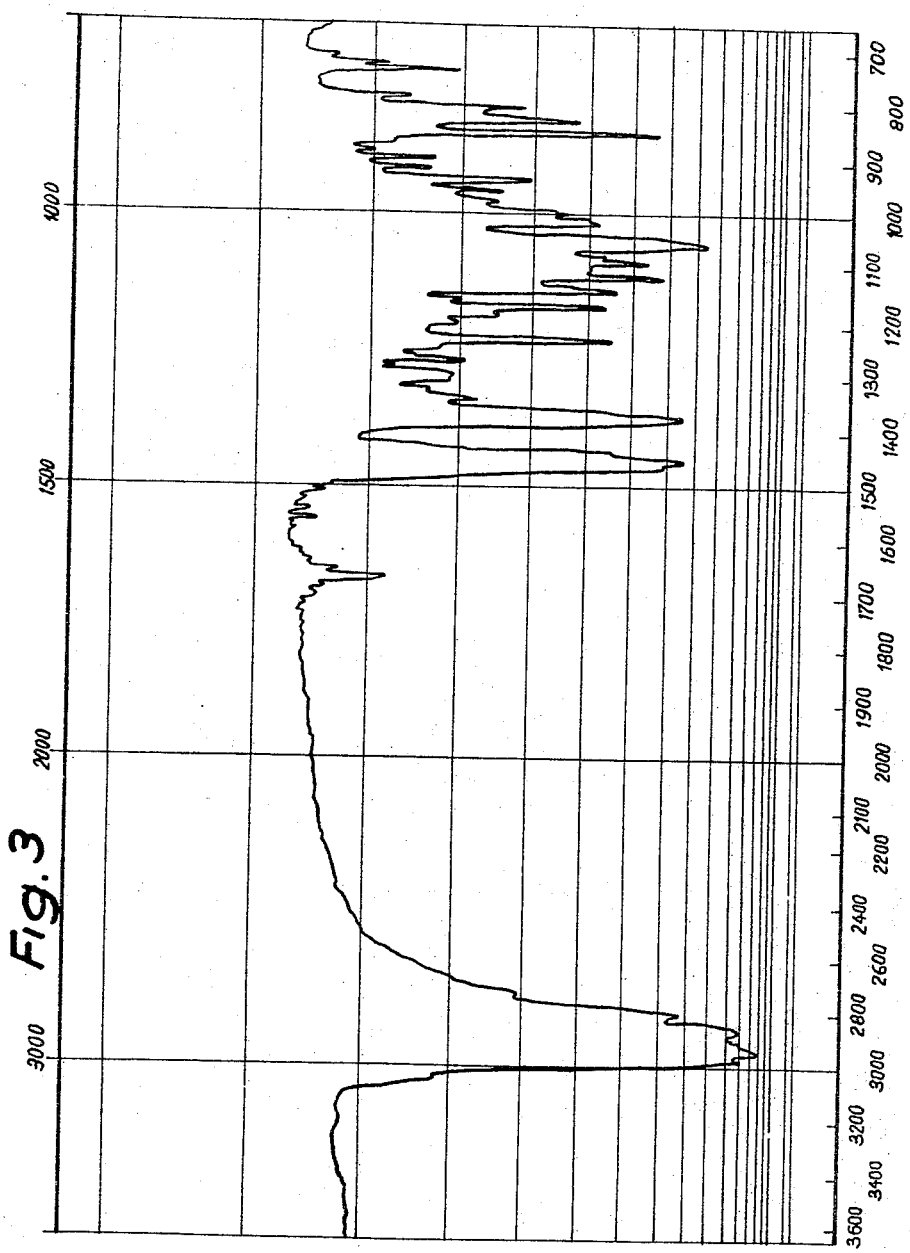

The infra-red spectrum of the compound is shown in FIGURE 3.

*Example 4.—(20R)-3β-N-methylamino-18,20-oxido-5α-pregnane*

100 mg. of dihydroparavallarinol are dissolved in 10 cc. of methanol containing 2 cc. of hydrochloric acid. The mixture is heated under reflux for 30 minutes on the water bath. The reaction mixture is added to 150 cc. of distilled water, is made alkaline with sodium hydroxide and extracted with ether. There are thus obtained 95 mg. of the desired product, which is recrystallised from a mixture of acetone and ether, and then melts at 107–108° C. $(\alpha)_D^{20°}=+11°$ (c.=0.380 in chloroform).

Analysis for $C_{22}H_{37}ON$ gives: Calculated: C=79.70%; H=11.25%. Found: C=79.51%; H=11.14%.

Figure 4:
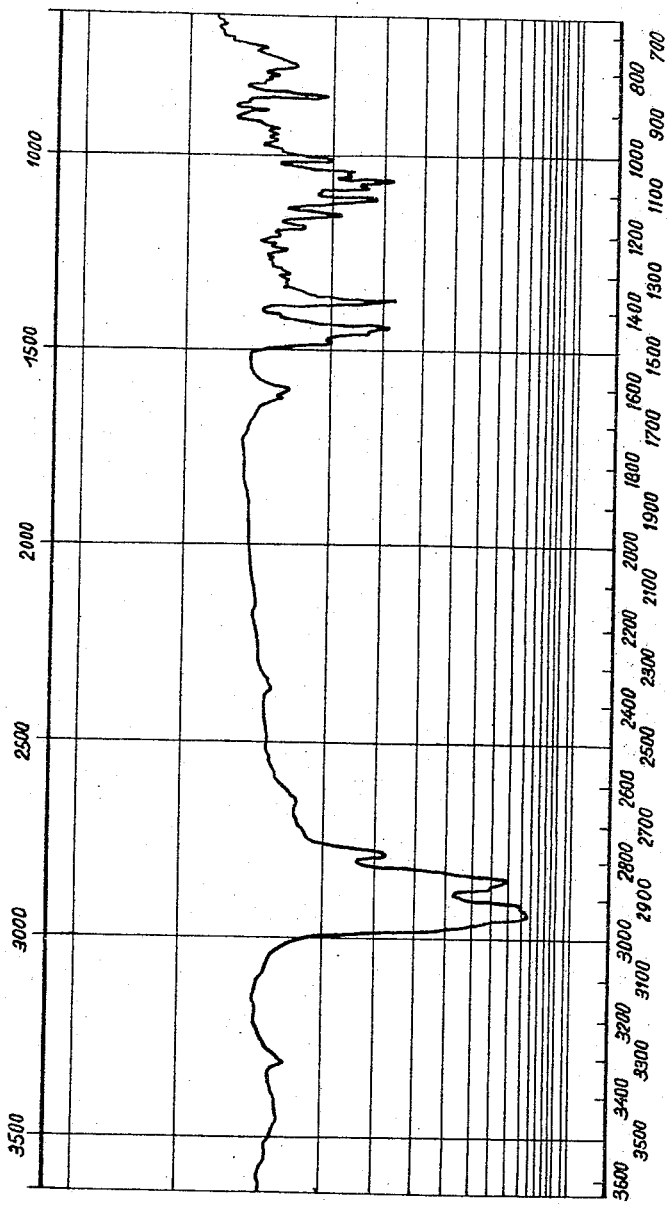

The infra-red spectrum of the product is shown in FIGURE 4.

*Example 5.—(20R)-3β-N,N-dimethylamino-18,20-oxido-5α-pregnane*

By a method similar to that of Example 4, 100 mg. of N-methylhydroparavallarinol gave 90 mg. of the desired product, which is sublimed under 0.05 mm. Hg at 140° C. The pure product melts at 119–120° C. $(\alpha)_D^{20°}=+4.3$ (c.=1.15 in chloroform).

Analysis for $C_{23}H_{39}ON$ gives: Calculated: C=79.94%; H=11.38%. Found: C=79.76%; H=11.27%.

Figure 5:
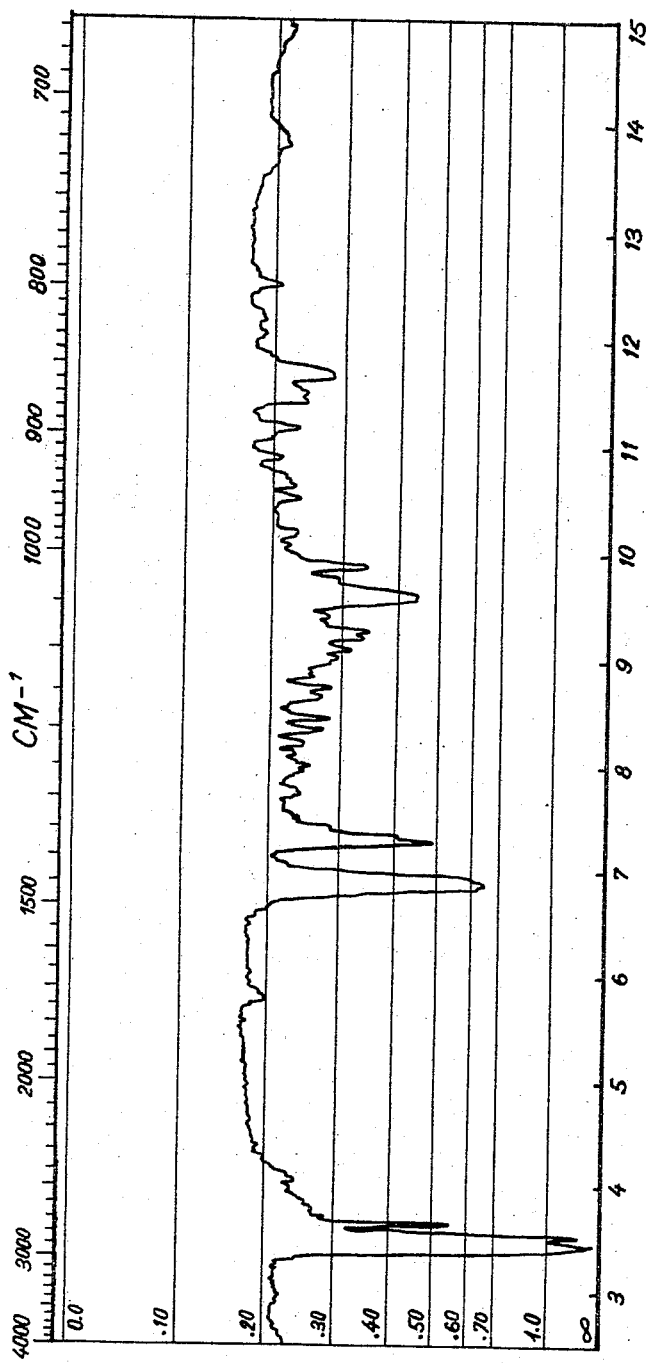

The infra-red spectrum of the product is shown in FIGURE 5.

*Example 6.—(20R)-3β-N,N-dimethylamino-16α-hydroxy-18,20-oxido-5α-pregnane*

0.450 g. of (20S)-3β-N,N-dimethylamino-16α,18,20-trihydroxy-5α-pregnane treated according to the process described in Example 4, gives 0.400 g. of the desired product, which is twice recrystallized for analysis, and then melts at 152–153° C. $(\alpha)_D^{20°}=0°$ (c.=0.75 in chloroform).

Analysis for $C_{23}H_{39}O_2N$ gives: Calculated: C=76.40%; H=10.87%. Found: C=76.22%; H=10.82%.

Figure 6:
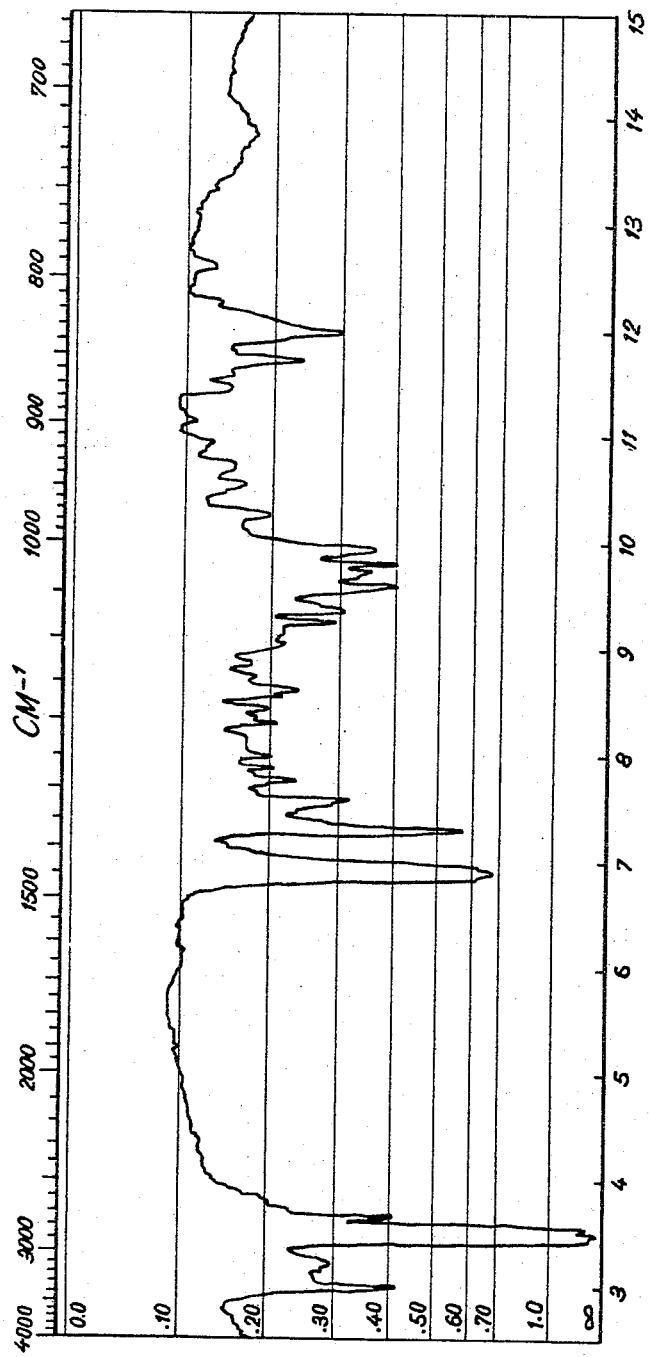

The infra-red spectrum of the product is shown in FIGURE 6.

*Example 7.—(20R)-3β-N,N-dimethylamino-16β-hydroxy-18,20-oxido-5α-pregnane*

0.280 g. of (20S)-3β-N,N-dimethylamino-16β,18,20-trihydroxy-5α-pregnane is treated according to the method described in Example 4 and gives 0.200 g. of the desired product, which is recrystallized for analysis, and then melts at 200–202° C. $(\alpha)_D^{20°}=+16°$ (c.=0.44% in chloroform).

Analysis for $C_{23}H_{39}O_2N$ gives: Calculated: C=76.40%; H=10.87%. Found: C=76.21%; H=10.89%.

Figure 7:
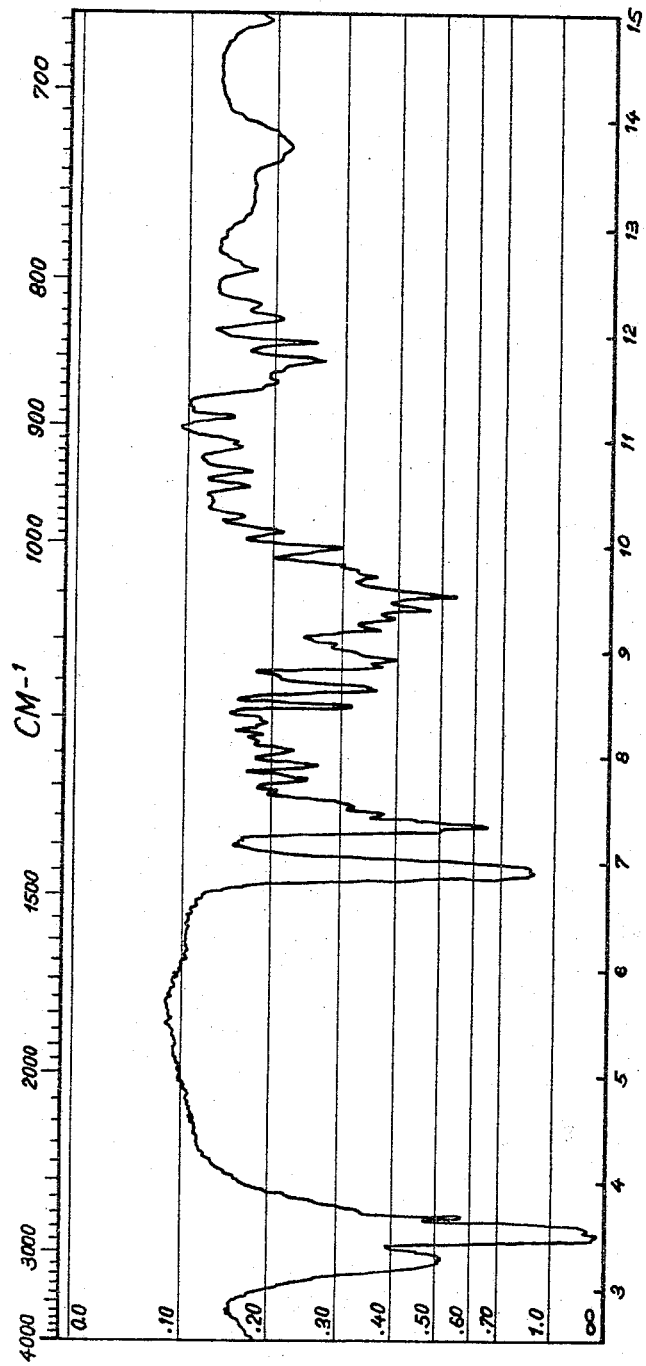

The infra-red spectrum of this compound is shown in FIGURE 7.

*Example 8.—(20R)-3β-N,N-dimethylamino-16-oxo-18,20-oxido-5α-pregnane*

(a) 0.0320 g. of the product of Example 6 is dissolved in 30 cc. of dimethylformamide and 5 drops of sulfuric acid are added. To this mixture is added 0.320 g. of chromic anhydride dissolved in a mixture of 20 cc. of dimethylformamide and 5 drops of sulfuric acid. After contact for 3 hours with stirring, the mixture is diluted with 200 cc. of water, made alkaline with sodium hydroxide and extracted with chloroform. The organic solution is separated by decantation, washed with water, and then dried and distilled. The residue, weighing 300 mg., is the desired ketone, and on recrystallization from methanol, melts at 145–146° C. $(\alpha)_D^{20°} = -142°$ (c.=0.79 in chloroform).

Analysis for $C_{23}H_{37}O_2N$ gives: Calculated: C=76.83%; H=10.37%. Found: C=76.72%; H=10.17%.

Figure 8:
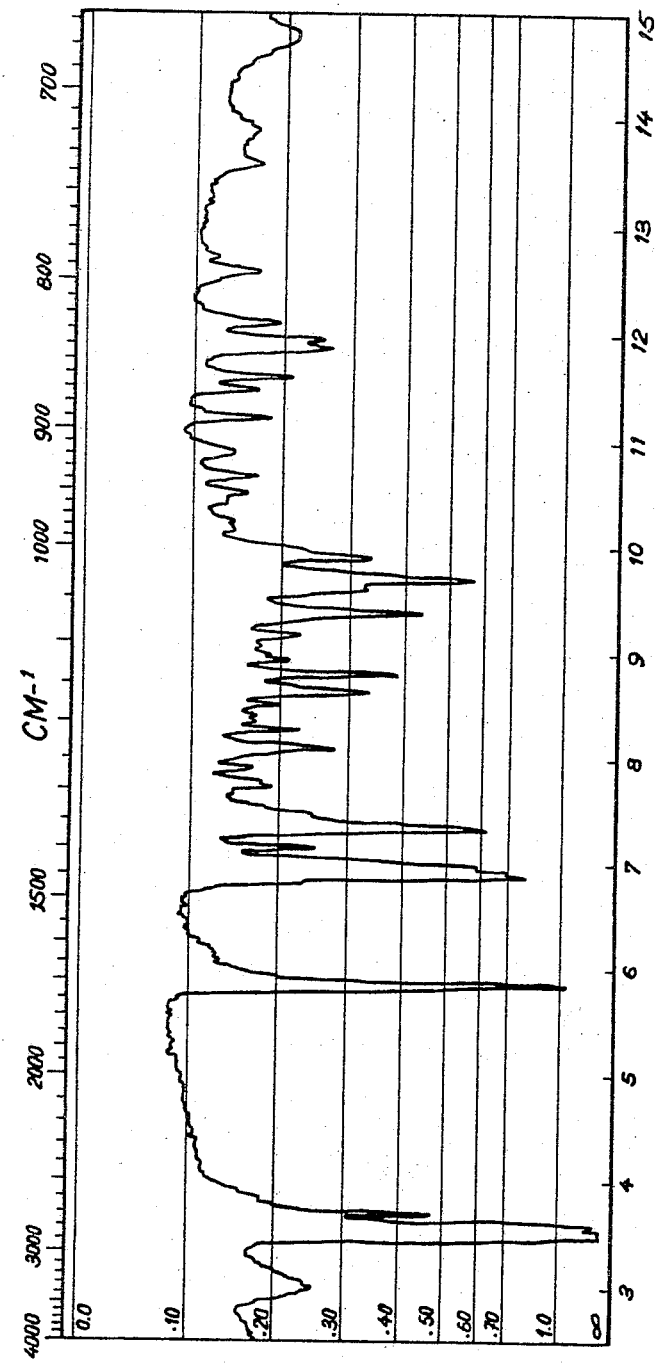

The infra-red spectrum of this compound in shown in FIGURE 8.

(b) The same product is obtained by oxidizing the compound of Example 7, the reaction product having the same properties as those given above.

(c) By reducing 0.100 g. of the product described under (a) or (b) with sodium borohydride, there is obtained 0.090 g. of the alcohol of Example 7, which has the same properties as those given in that example.

*Example 9.—3β-(N-methyl-N-acetylamino)-18-methoxycarbonyl-20-oxo-5- pregnene*

200 mg. of the methyl ester of N-acetylparavallaric acid, (A) in the scheme given below, are dissolved in 10 cc. of dimethylformamide and mixed with 10 cc. of this same solvent containing, in solution, 200 mg. of chromic acid anhydride. After the addition of a few drops of concentrated sulfuric acid, the reaction mixture is left at ambient temperature for 19 hours. It is then added to 400 cc. of distilled water containing a few drops of methanol, made alkaline with ammonia, and extracted with a mixture of ether and chloroform. The organic layer is decanted, washed with a dilute sodium hydroxide solution and then with water, dried and distilled. There is thus obtained a residue weighing 180 mg., which is dissolved in benzene and chromatographed on 6 g. of alumina. Elution with ether yields 110 mg. of ketone ester (hereinafter designated (B)), which is recrystallized for analysis from ether and then melts at 178–180° C. $(\alpha)_D^{20°} = +2°$ (c.=0.7 in chloroform).

Analysis for $C_{25}H_{37}O_4N$ gives: Calculated: C=72.25%; H=8.98%. Found: C=72.01%; H=9.06%.

Figure 9:
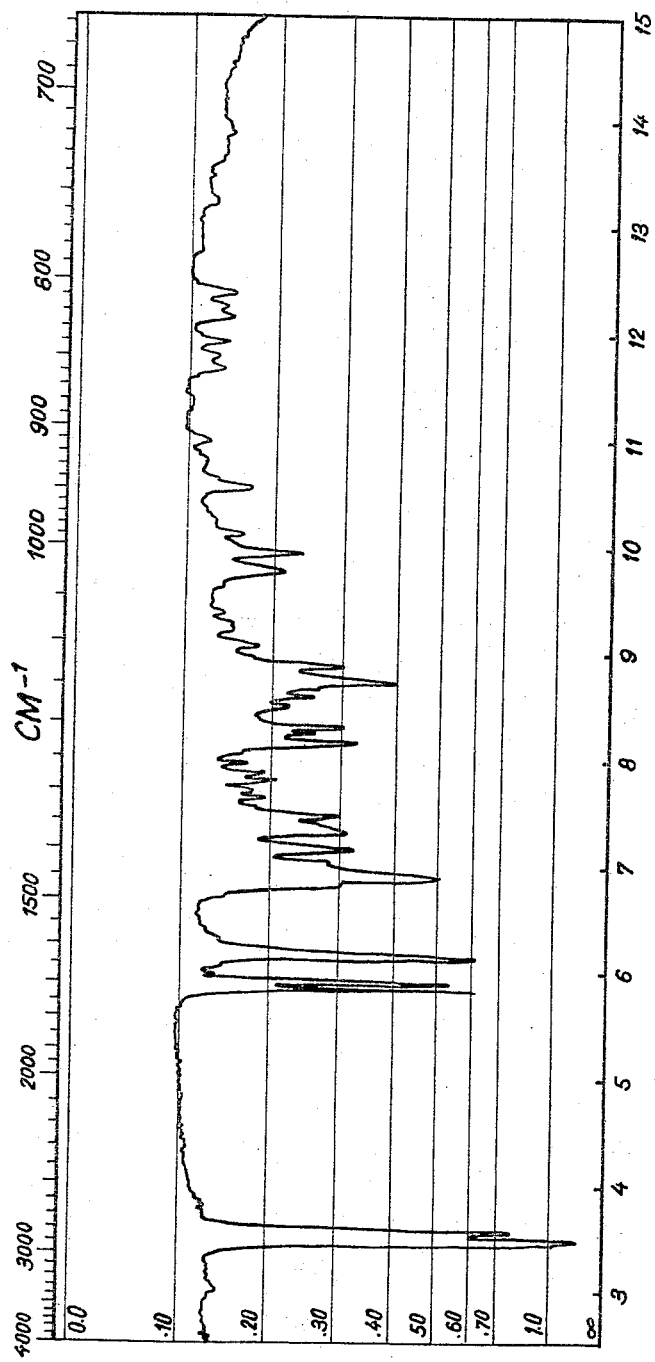

The infra-red spectrum of compound (B) is shown in FIGURE 9.

(b) *(20R) - 3β - (N-methyl-N-ethylamino)-18,20-dihydroxy-5-pregnene.*—200 mg. of compound (B) yield, on reduction with aluminium-lithium hydride by the method described above 180 mg. of the desired product (hereinafter called (C)), which is twice recrystallized for analysis and then melts at 236° C. $(\alpha)_D^{20°} = -46.5°$ (c.=0.60, in a mixture of methanol and pyridine (2:1)).

Analysis for $C_{24}H_{41}O_2N$ gives: Calculated: C=76.75%; H=11.00%. Found: C=76.99%; H=10.76%.

Figure 10:
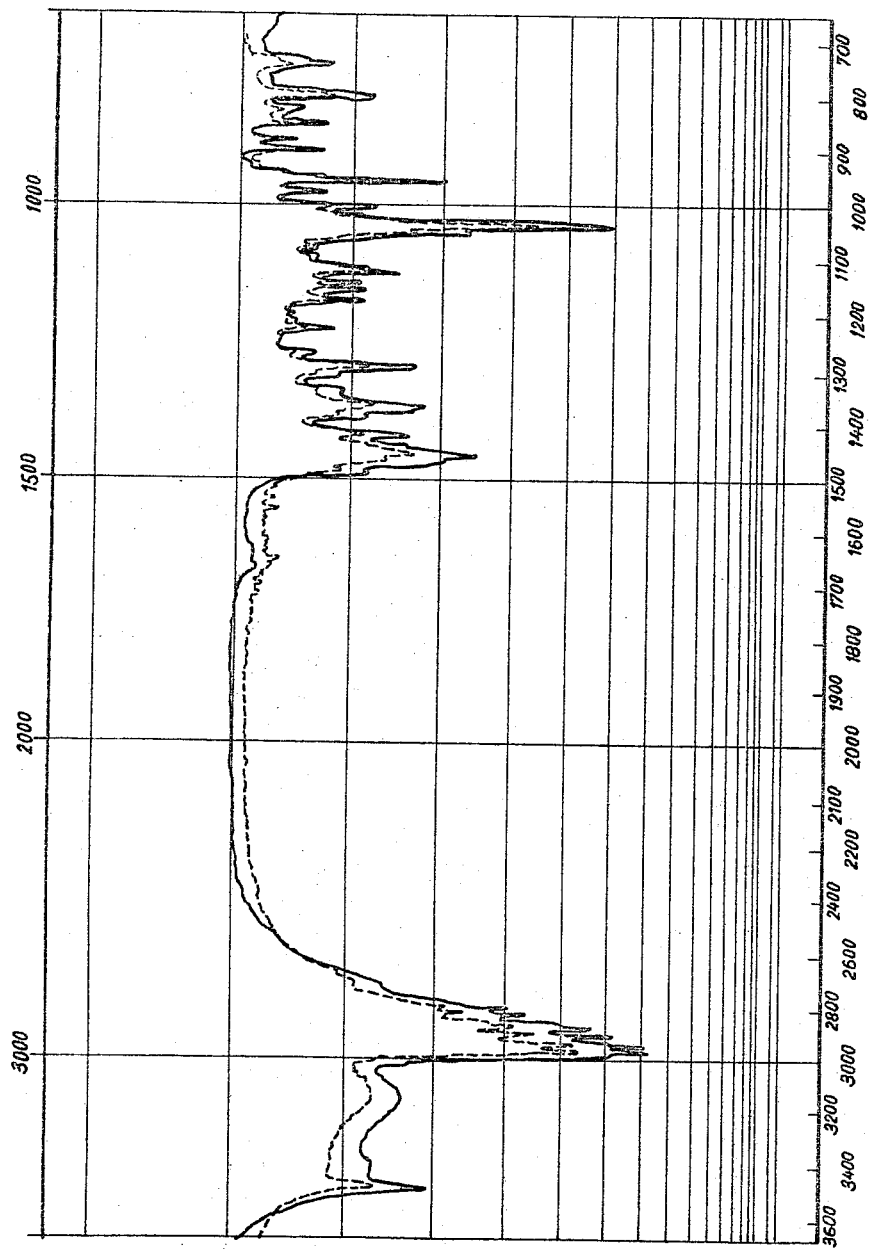

The infra-red spectrum of the above compound (C) is shown in FIGURE 10.

The diacetylated derivative of compound (C) was also prepared. It melts at 124–125° C. $(\alpha)_D^{20°} = +3.5°$ (c.=1.1, in chloroform).

Analysis for $C_{28}H_{45}O_4N$ gives: Calculated: C=73.16%; H=9.87%. Found: C=72.99%; H=9.75%.

Figure 11:
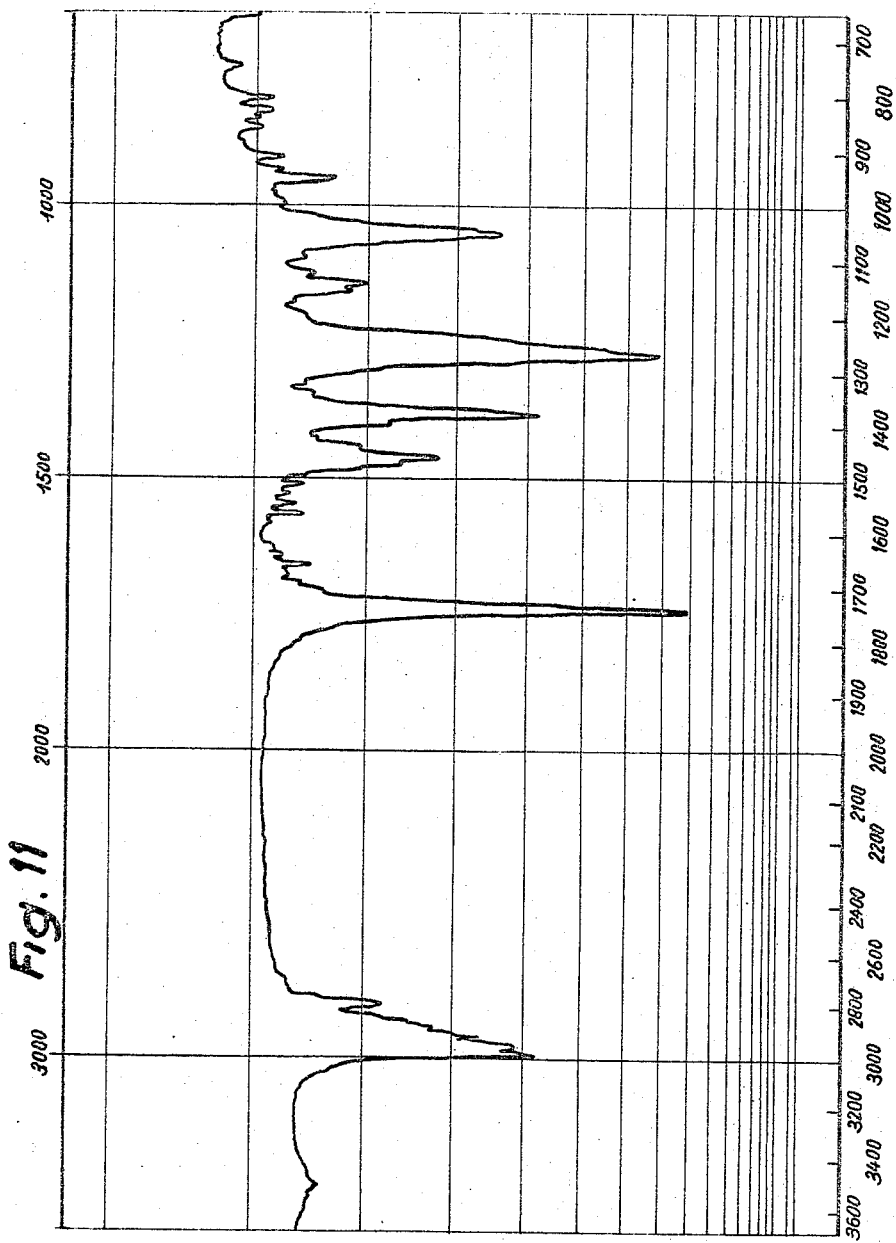

The infra-red spectrum of this compound is shown in FIGURE 11.

(c) *(20S) - 3β - (N - methyl-N-ethylamino)-18,20-oxido-5-pregnene.*—400 mg. of compound (C) are treated in acid alcoholic medium under the conditions described in Example 4. Extraction with chloroform yields 400 mg. of an amorphous product, which is shown by thin-layer chromatography to be a mixture containing 30–40% of unchanged compound (C). The product is dissolved in methylene chloride and chromatographed on alumina. Elution with the same solvent yields 230 mg. of the desired cyclized product in pure form, while elution with chloroform yields a fraction of 150 mg. consisting mainly of compound (C) with a little of the cyclized product. The first fraction is recrystallized, and then melts at 119–120° C. $(\alpha)_D^{20°} = -18.5$ (c.=0.86 in chloroform).

Analysis for $C_{24}H_{39}ON$ gives: Calculated: C=80.61%; H=10.99%. Found: C=80.86%; H=10.96%.

Figure 12:
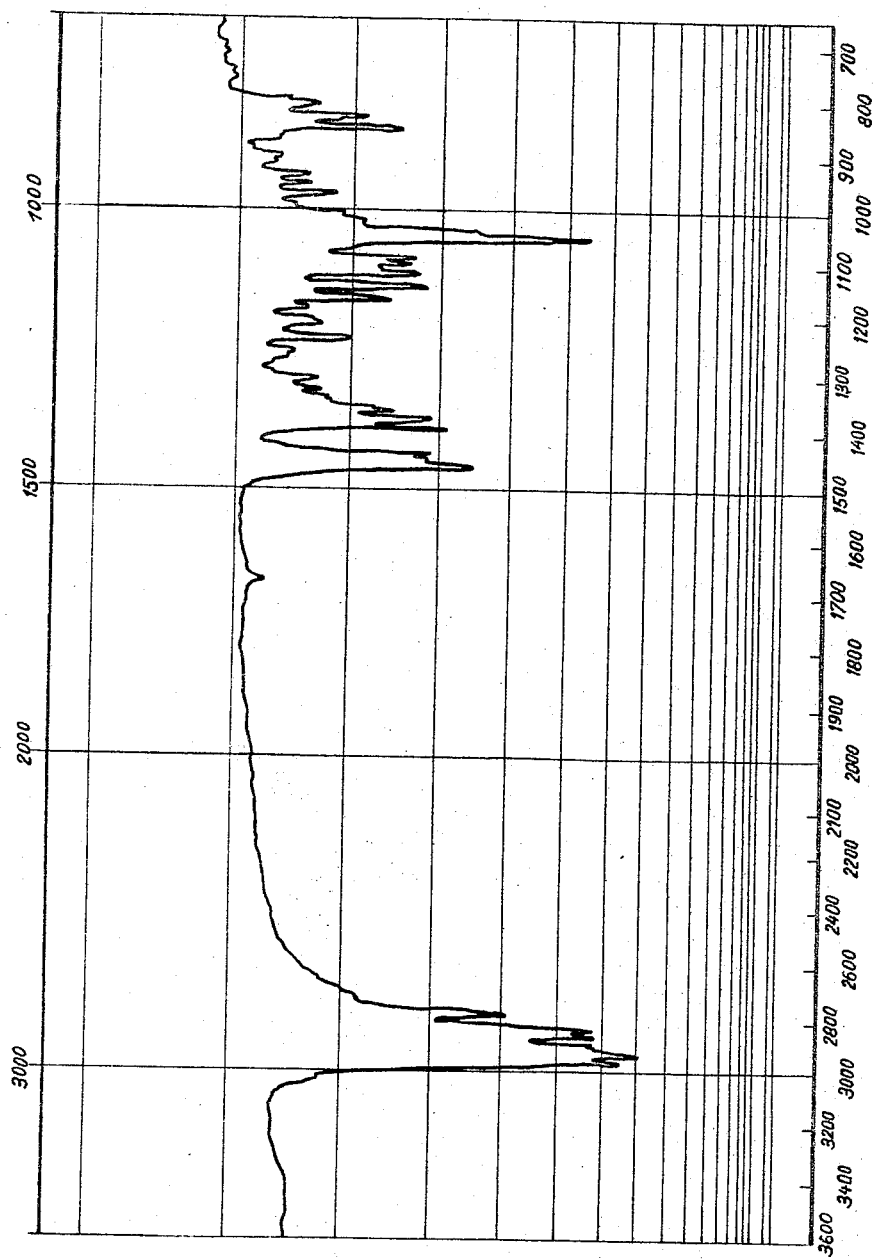

The infra-red spectrum of the final product (hereinafter called (D)) is shown in FIGURE 12.

The three reactions described in (a), (b) and (c) may be diagrammatically represented by the following scheme:

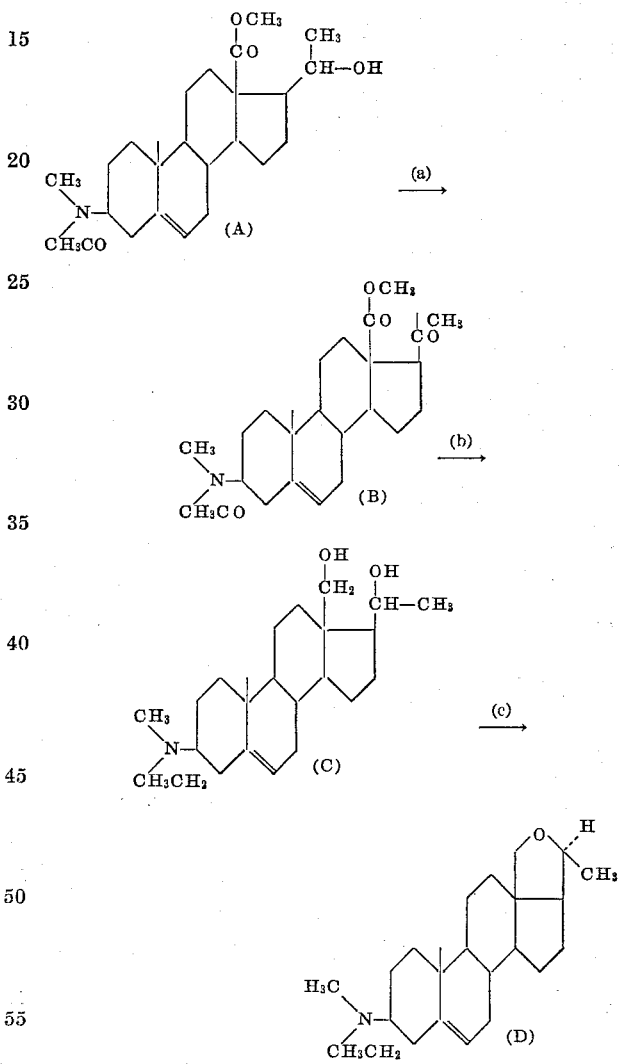

*Example 10.—(20R)-3β-(N-methyl-N-acetylamino)-18,20-oxido-5α-pregnane*

100 mg. of the product of Example 4 are dissolved in 2 cc. of anhydrous pyridine and 10 cc. of acetic anhydride and allowed to stand for 12 hours. The excess acetic anhydride and pyridine are driven off on the water bath under reduced pressure and the crystalline residue is dissolved in benzene, and then chromatographed on alumina. Elution with the same solvent yields the desired product, which is recrystallized from ether and then melts at 205° C. $(\alpha)_D^{20°} = 0°$ (c.=0.73 in chloroform).

Analysis for $C_{24}H_{39}O_2N$ gives: Calculated:

C=77.16%

H=10.52%. Found: C=77.33%; H=10.41%.

Figure 13:
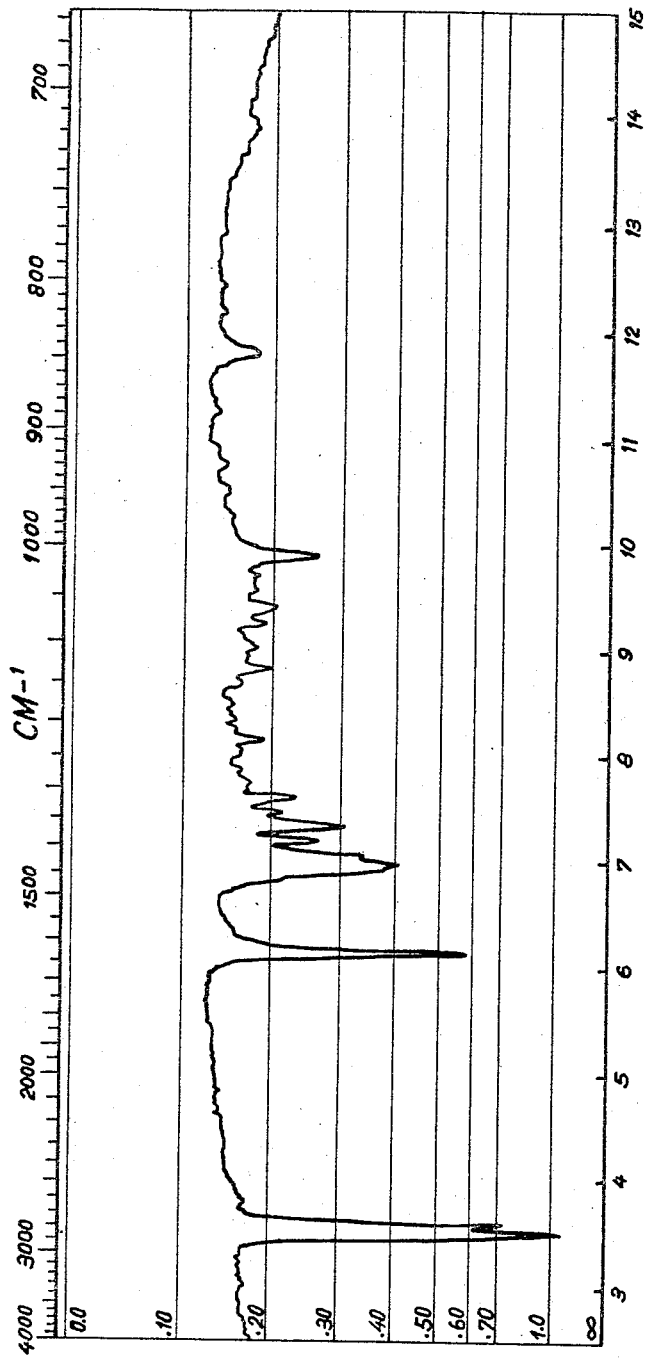

The infra-red spectrum of this compound is shown in FIGURE 13.

This example shows that the amino groups of the compounds of the invention can readily be acylated by conventional procedures.

*Example 11.—(20R)-3β-N-methylamino-16α-hydroxy-18, 20-oxido-5-pregnene*

A solution of 1 g. of paravallaridinol ((20S)-3β-N-methylamino-16α,18,20-trihydroxy-5-pregnene) in 150 cc. of methanol containing 5 cc. of concentrated hydrochloric acid is heated under reflux on a water bath for 30 minutes. The reaction medium is poured into 300 cc. of water, made alkaline by sodium hydroxide and extracted with chloroform. There are thus obtained 957 mg. of crude product which is dissolved in benzene and subjected to chromatography on alumina after a slight insoluble deposit has been eliminated by filtration. The fractions eluted with ether-methanol (98–2) and weighing together 436 mg. are homogeneous when subjected to plate chromatography. This material is recrystallized twice from acetone to give the pure 18,20R-oxido derivative, M.P. 175° C. $(\alpha)_D^{20°}=-61°$ (c.=0.478 in chloroform).

Analysis for $C_{22}H_{35}O_2N$ gives: Calculated: C=76.47%; H=10.21%. Found: C=76.79%; H=10.27%.

Figure 14:
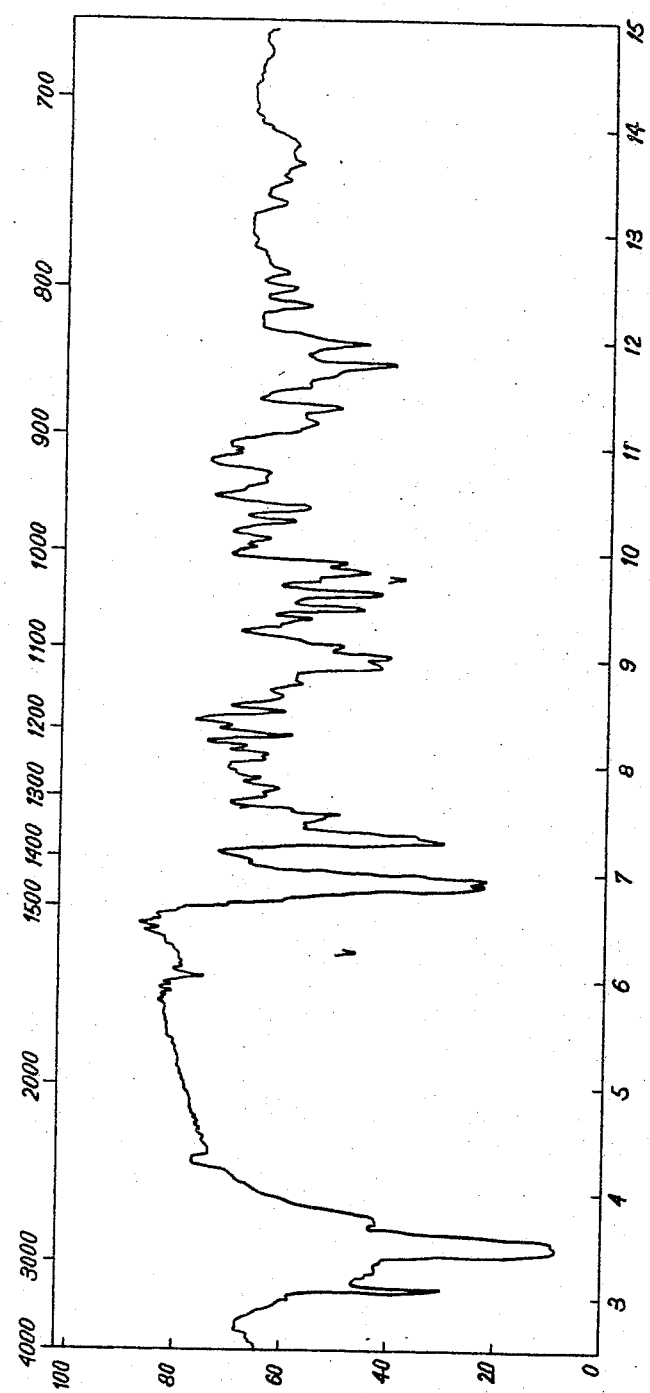

The infra-red spectrum of this compound is shown in FIGURE 14 of the accompanying drawings.

*Example 12.—(20R)-3β-N-methyl-N-acetylamino-16α-acetoxy-18,20-oxido-5-pregnene*

100 mg. of the compound obtained in Example 11 are heated to 100° C. for one hour with 5 cc. of acetic anhydride and 1 cc. of pyridine. The reaction medium is poured into 100 cc. of water and extracted with 200 cc. of ether. The ethereal solution is washed with water, dried over dry sodium sulfate and distilled, leaving a residue of 112 mg., which on crystallisation from acetone, provides 88 mg. of the di-acetyl derivative, M.P. 165° C. $(\alpha)_D^{20°}=-33°$ (c.=0.50 in chloroform).

Analysis for $C_{26}H_{39}O_4N$ gives: Calculated: C=72.69%; H=9.15%; N=3.26%. Found: C=72.14%; H=9.13%; N=3.64%.

Figure 15:
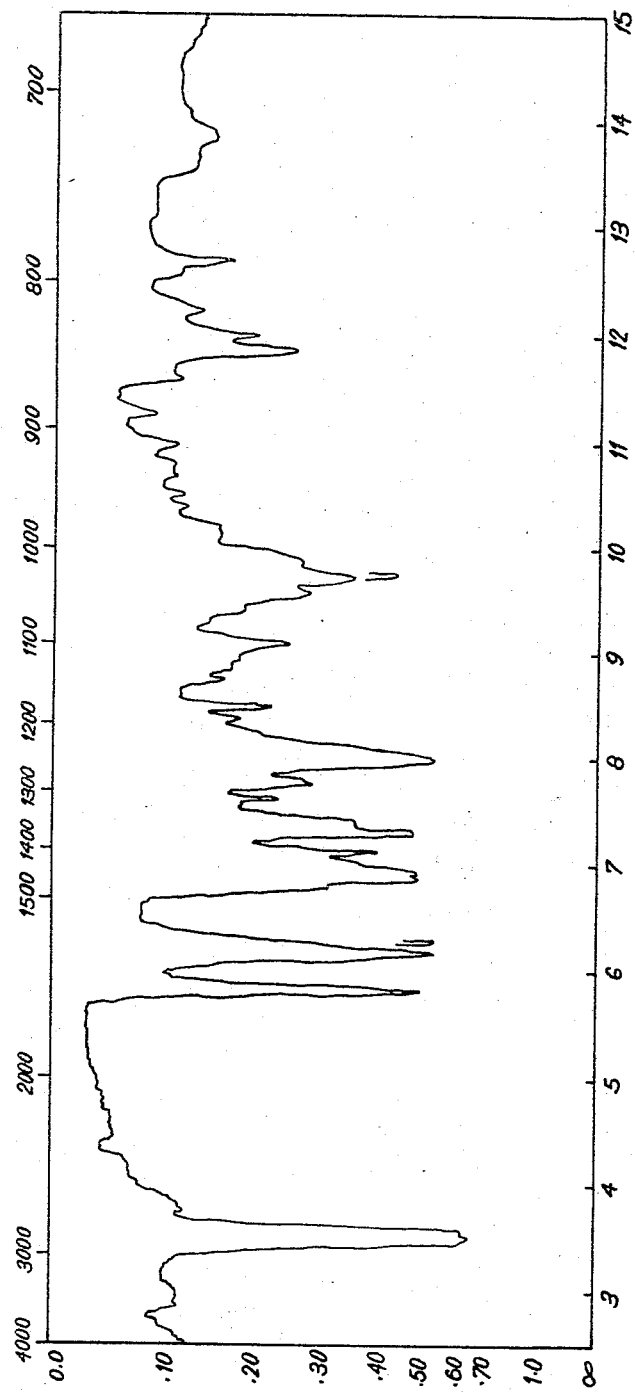

The infra-red spectrum of this compound is shown in FIGURE 15 of the accompanying drawings.

*Example 13.—(20R)-3β-N-methylamino-16α-hydroxy-18,20-oxido-5α-pregnane*

When treated in the manner described in Example 11, 460 mg. of dihydroparavallaridinol ((20S)-3β-N-methylamino-16α,18,20-trihydroxy-15α-pregnane) give 285 mg. of the 18,20R - oxido derivative, M.P. 174° C. $(\alpha)_D^{20°}=0\pm2°$ (c.=0.79 in chloroform).

Analysis for $C_{22}H_{37}O_2N$ gives: Calculated: C=76.03%; H=10.73%. Found: C=75.8%; H=10.87%.

Figure 16:
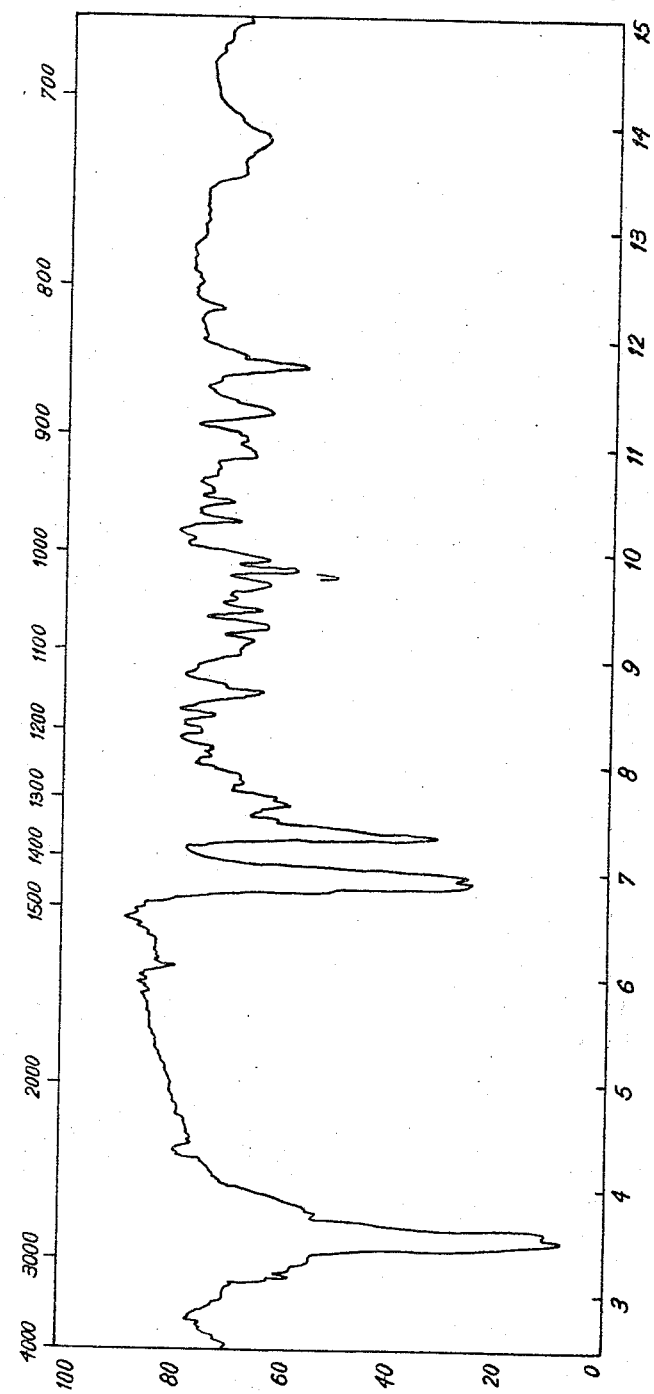

The infra-red spectrum of this compound is shown in FIGURE 16 of the accompanying drawings.

*Example 14.—(20R)-3β-N,N-dimethylamino-16α-hydroxy-18,20-oxido-5-pregnene*

When subjected to the procedure described in Example 11, 515 mg. of N-methyl-paravallaridinol ((20S)-3β-N, N - dimethylamino - 16α,18,20 - trihydroxy-5-pregnene), yield 318 mg. of the 18,20R-oxido derivative, M.P. 165° C. $(\alpha)_D^{20°}=-52°$ (c.=0.52 in chloroform).

Analysis for $C_{23}H_{37}O_2N$ gives: Calculated: C=76.83%; H=10.37%. Found: C=76.98%; H=10.50%.

Figure 17:
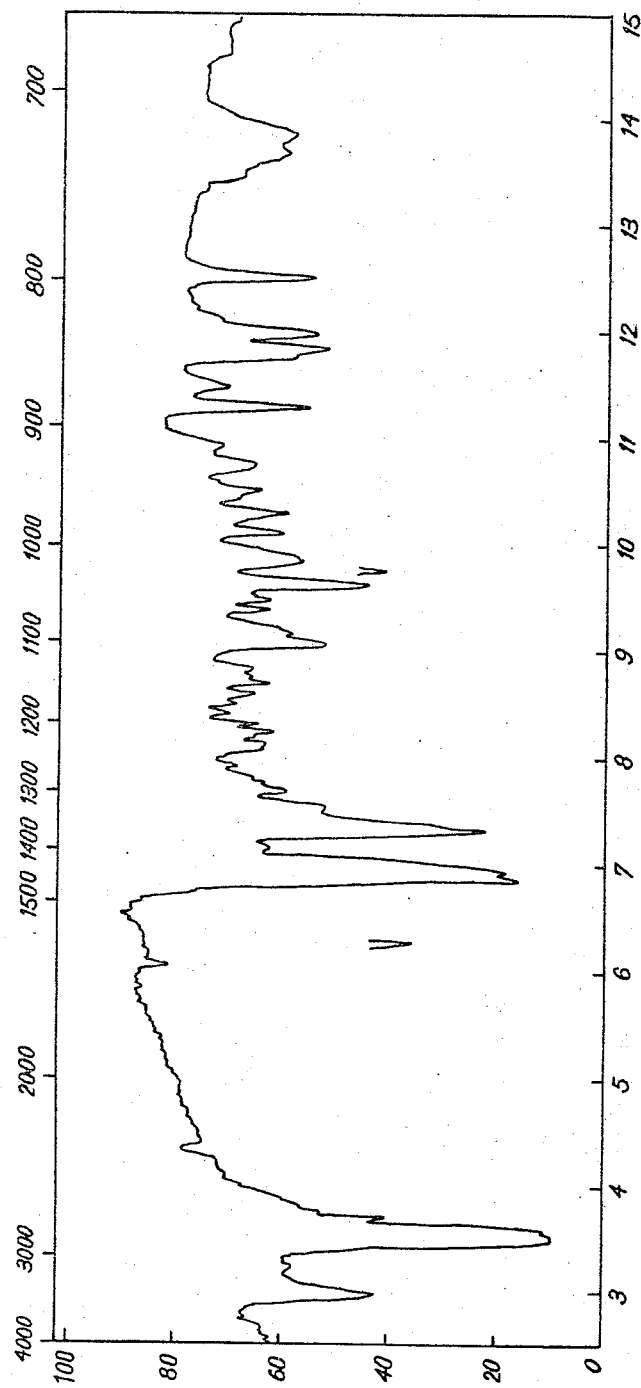

The infra-red spectrum of this compound is shown in FIGURE 17 of the accompanying drawings.

*Example 15.—(20R)-3β-N-methylamino-16β-hydroxy-18,20-oxido-5α-pregnane*

(a) When subjected to the procedure described in Example 11, 685 mg. of 16-epi-dihydroparavallaridinol ((20S) - 3β - N - methylamino - 16β,18,20-trihydroxy-5α-pregnane) yield 472 mg. of the 18,20R-oxido-derivative, M.P. 233° C. $(\alpha)_D^{20°}=+16°$ (c.=0.75 in chloroform).

Analysis for $C_{22}H_{37}O_2N$ gives: Calculated: C=76.03%; H=10.73%. Found: C=76.25%; H=10.46%.

Figure 18:
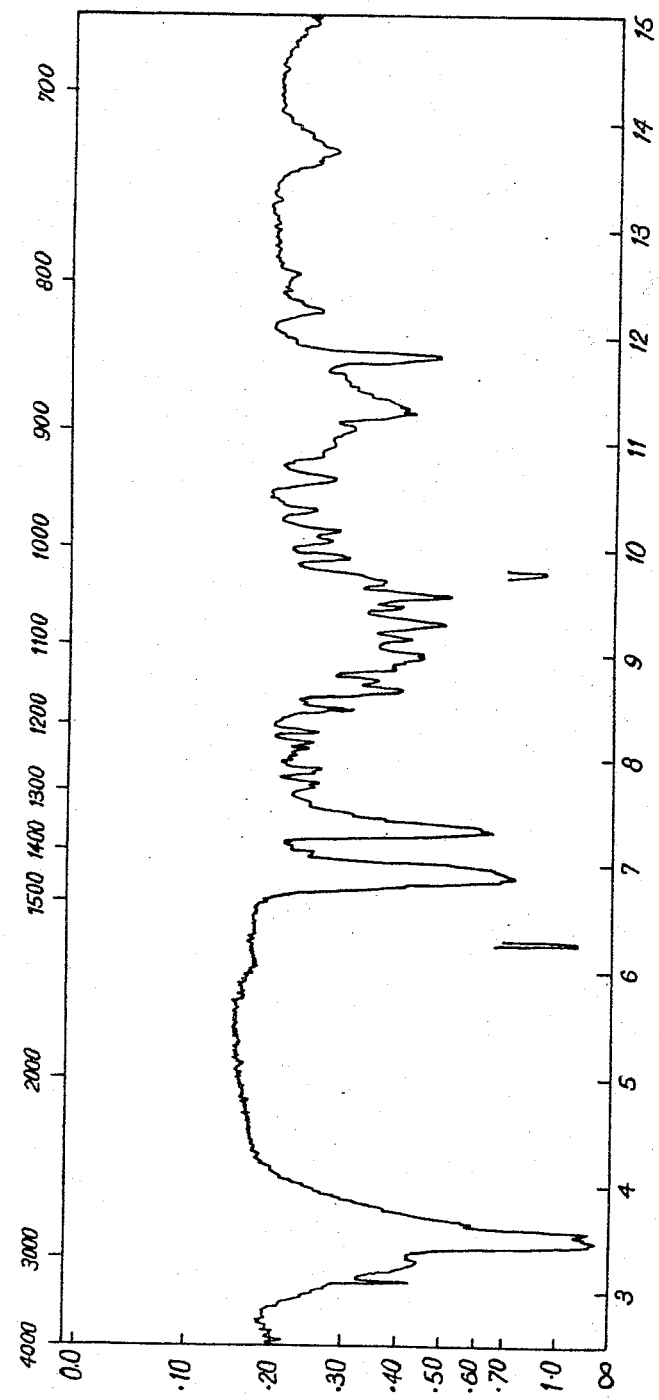

The infra-red spectrum of this compound is shown in FIGURE 18 of the accompanying drawings.

(b) The same oxido derivative can be obtained by reduction with potassium borohydride of the corresponding ketone, described in the following Example 16. To 50 mg. of the ketone dissolved in 10 cc. of methanol, 100 mg. of potassium borohydride are added in 3 lots over a period of one hour with stirring. The reaction mixture, diluted with 50 cc. of water, is extracted with ether. The ethereal solution is separated, washed with water, dried and then distilled, yielding 42 mg. of the desired product as residue, M.P. 233° C. $(\alpha)_D^{20°}=+16°$. It is identical with the compound obtained by the other method.

*Example 16.—(20R)-3β-N-methylamino-16-oxo-18, 20-oxido-5α-pregnane*

To a solution of 270 mg. of the 18,20R-oxido-16α-ol derivative prepared as in Example 13 in 20 cc. of dimethylformamide containing five drops of sulfuric acid, there are added 270 mg. of chromic anhydride in solution in 10 cc. of dimethylformamide containing seven drops of sulfuric acid. The mixture is stirred for three hours at normal temperature. After dilution with 500 cc. of water and being made alkaline with sodium hydroxide, extraction by chloroform yields 275 mg. of crude product, which are dissolved in 50 cc. of benzene and subjected to chromatography on 8 g. of alumina. The fractions washed out with ether give 180 mg. of the desired ketone, which is recrystallized for analysis from hexane, M.P. 115° C. $(\alpha)_D^{20°}=-161°$ (c.=0.36 in chloroform).

Analysis for $C_{22}H_{35}O_2N$ gives: Calculated: C=76.47%; H=10.21%. Found: C=76.30%; H=10.25%.

Figure 19:
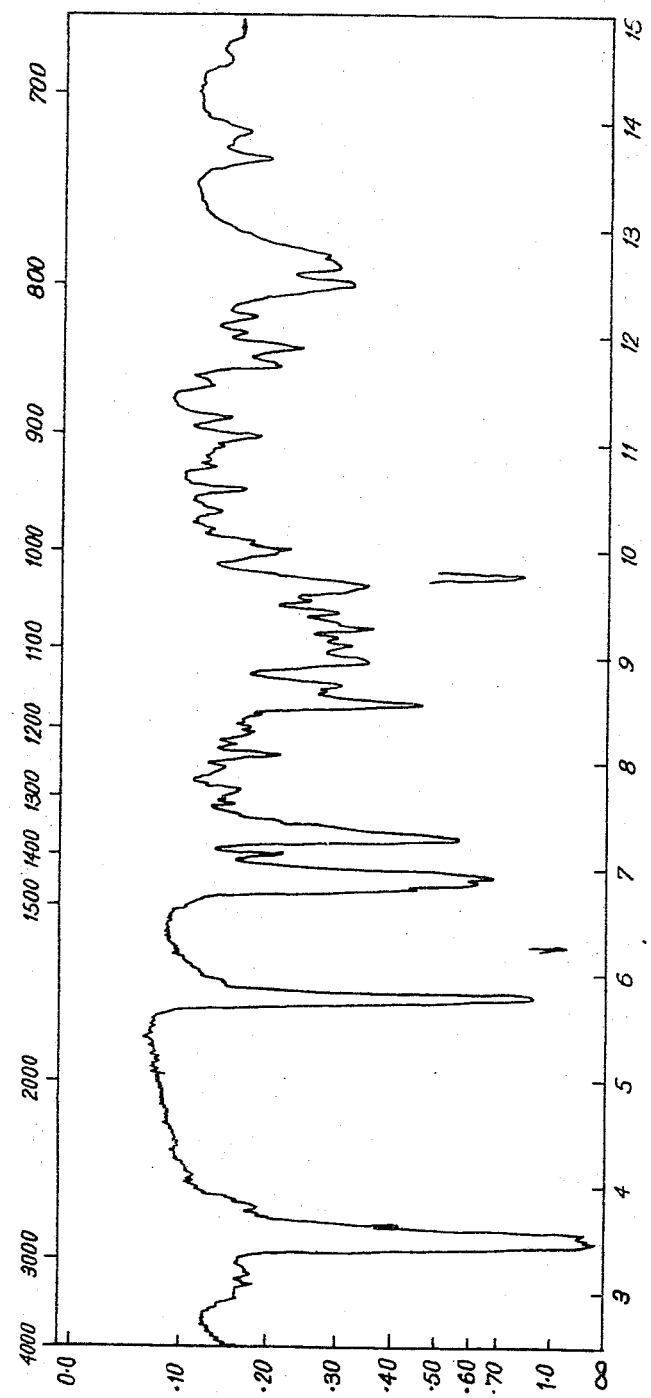

The infra-red spectrum of this compound is shown in FIGURE 19 of the accompany drawings.

The same ketone can be obtained by oxidation by the same technique of the 16β-alcohol described in Example 15.

*Example 17.—(20R)-3β-N,N-dimethylamino-16α-hydroxy-18,20-oxido-5-pregnene*

100 mg. of the product of Example 11 are methylated by heating under reflux for 6 hours with 2 cc. of 30% formaldehyde solution and 5 cc. of formic acid. The reaction mixture is poured into 150 cc. of water, made alkaline by sodium hydroxide, and extracted with chloroform. The crude product obtained by distillation of the chloroform phase yields 63 mg. of a product, after recrystallisation from acetone, M.P. 165° C. $(\alpha)_D^{20°}=-51°$ (c.=0.51). The compound is identical with the product of Example 14.

*Example 18.—(20R)-3β-N-methylamino-16α-hydroxy-18,20-oxido-5α-pregnane*

90 mg. of the 18,20-oxido product of Example 11, dissolved in 10 cc. of acetic acid, are catalytically hydrogenated at normal pressure and temperature in the presence of Adams' platinum catalyst. After elimination of the catalyst by filtration, dilution of the reaction mixture in 50 cc. of distilled water, the product is made alkaline with sodium hydroxide and extracted by chloroform. There are obtained 70 mg. of residue, which is recrystallized from acetone, and then has M.P. 174° C. $(\alpha)_D^{20°}=0\pm2°$ (c.=0.64 in chloroform). It is identical with the product of Example 13.

I claim:
1. A compound of the formula:

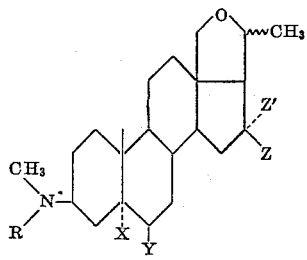

and its acid addition salts, wherein R represents a member selected from the class consisting of hydrogen, alkyl and acyl, X and Y taken singly represent hydrogen and together represent a single bond, when taken singly one of Z and Z' is hydrogen and the other represents a member selected from the class consisting of hydroxy and acyloxy, and when taken together Z and Z' represent an oxo group.

2. A compound as claimed in claim 1 in which R contains a maximum of 4 carbon atoms.
3. (20R) - 3β - N,N - dimethylamino - 18,20-oxido-5-pregnene.
4. (20R)-3β-N-methylamino-18,20-oxido-5-pregnene.
5. (20R) - 3β - (N - methyl - N - ethylamino)-18,20-oxido-5-pregnene.
6. (20R) - 3β - N,N - dimethylamino-16α-hydroxy-18,20-oxido-5α-pregnane.
7. (20R) - 3β - N,N - dimethylamino-16β-hydroxy-18,20-oxido-5α-pregnane.
8. (20R) - 3β - N,N - dimethylamino - 16-oxo-18,20-oxido-5α-pregnane.
9. (20S) - 3β - (N - methyl - N - ethylamino) - 18,20-oxido-5-pregnene.
10. (20R) - 3β - (N - methyl - N-acetylamino)-18,20-oxido-5α-pregnane.
11. (20R) - 3β - N - methylamino-16α-hydroxy-18,20-oxido-5-pregnene.
12. (20R) - 3β - N - methyl - N - acetylamino - 16α-acetoxy-18,20-oxido-5-pregnene.
13. (20R) - 3β - N - methylamino-16α-hydroxy-18,20-oxido-5α-pregnane.
14. (20R) - 3β - N,N - dimethylamino-16α-hydroxy-18,20-oxido-5-pregnene.
15. (20R) - 3β - N - methylamino-16β-hydroxy-18,20-oxido-5α-pregnane.
16. (20R) - 3β - N - methylamino-16-oxo-18,20-oxido-5α-pregnane.

17. Process for the preparation of an aminopregnane derivative of the formula:

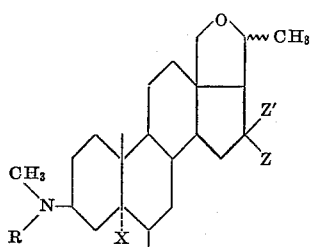

and its acid addition salts, wherein R represents a member selected from the class consisting of hydrogen, alkyl and acyl, X and Y taken singly represent hydrogen and together represent a single bond, when taken singly one of Z and Z' is hydrogen and the other represents a member selected from the class consisting of hydroxy and acyloxy, and when taken together Z and Z' represent an oxo group, which comprises treating with a mineral acid in a polar solvent at a temperature between 60° and 100° C. a compound of the formula:

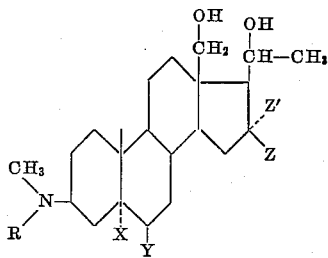

wherein R, X, Y, Z and Z' are as hereinbefore defined.

18. Process according to claim 17 in which the said compound is treated with aqueous alcoholic hydrochloric acid.

References Cited

Beugelmans et al.: Bull. Soc. Chim., France, pages 140–143, January 1964.

Janot et al.: Bull. Soc. Chim., Japan, No. 3, pages 648–51 (1962).

LEWIS GOTTS, *Primary Examiner.*

H. A. FRENCH, *Assistant Examiner.*